United States Patent
Ichihara et al.

(10) Patent No.: US 10,557,029 B2
(45) Date of Patent: Feb. 11, 2020

(54) AUTOMOTIVE INTERIOR AND EXTERIOR MEMBER

(71) Applicant: MAZDA MOTOR CORPORATION, Hiroshima (JP)

(72) Inventors: Yohei Ichihara, Hiroshima (JP); Atsushi Fujita, Yokkaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 34 days.

(21) Appl. No.: 16/039,894

(22) Filed: Jul. 19, 2018

(65) Prior Publication Data

US 2019/0023888 A1    Jan. 24, 2019

(30) Foreign Application Priority Data

Jul. 21, 2017  (JP) ................. 2017-141463

(51) Int. Cl.
| | |
|---|---|
| *C08L 25/14* | (2006.01) |
| *C08L 69/00* | (2006.01) |
| *C08K 5/05* | (2006.01) |
| *C08K 5/13* | (2006.01) |
| *C08K 5/1535* | (2006.01) |
| *C08K 5/3445* | (2006.01) |
| *C08K 13/00* | (2006.01) |

(52) U.S. Cl.
CPC ............. *C08L 25/14* (2013.01); *C08K 5/05* (2013.01); *C08K 5/13* (2013.01); *C08K 5/1535* (2013.01); *C08K 5/3445* (2013.01); *C08L 69/00* (2013.01); *C08K 13/00* (2013.01)

(58) Field of Classification Search
USPC .......................... 427/379; 428/423.1; 525/67
See application file for complete search history.

(56) References Cited

U.S. PATENT DOCUMENTS

| | | |
|---|---|---|
| 4,506,066 A | 3/1985 | Medem et al. |
| 2006/0149024 A1 | 7/2006 | Ono et al. |
| 2013/0012628 A1 | 1/2013 | Sasaki |

FOREIGN PATENT DOCUMENTS

| | | |
|---|---|---|
| GB | 1079686 A | 8/1967 |
| JP | S56-55425 A | 5/1981 |
| JP | 2014-208800 A | 11/2014 |
| WO | 2004/111106 A1 | 12/2004 |
| WO | 2011/118768 A1 | 9/2011 |

*Primary Examiner* — Terressa Boykin
(74) *Attorney, Agent, or Firm* — Studebaker & Brackett PC

(57) ABSTRACT

An automotive interior and exterior member having high heat, impact, and weather resistance is provided. The automotive interior and exterior member is made of a thermoplastic resin composition containing a specific polycarbonate resin, butyl acrylate-methyl methacrylate-styrene based rubber, a specific hindered phenol based antioxidant, dibutylhydroxytoluene, 1,1,3-tris-(2-methyl-4-hydroxy-5-t-butylphenyl) butane, tris (2,4-di-t-butylphenyl) phosphite, bis (2,4-di-t-butylphenyl) pentaerythritol-diphosphite, a specific benzotriazole based weathering stabilizer, a specific hindered amine based weathering stabilizer, and a specific perinone based colorant.

3 Claims, No Drawings

AUTOMOTIVE INTERIOR AND EXTERIOR MEMBER

CROSS-REFERENCE TO RELATED APPLICATION

This application claims priority to Japanese Patent Application No. 2017-141463 filed on Jul. 21, 2017, the entire disclosure of which is incorporated by reference herein.

BACKGROUND

The present disclosure relates to an automotive interior and exterior member made of a thermoplastic resin composition containing a specific polycarbonate resin, butyl acrylate-methyl methacrylate-styrene based rubber, a specific hindered phenol based antioxidant, dibutylhydroxytoluene, 1,1,3-tris-(2-methyl-4-hydroxy-5-t-butylphenyl) butane, tris (2,4-di-t-butylphenyl) phosphite, bis (2,4-di-t-butylphenyl) pentaerythritol-diphosphite, a specific benzotriazole based weathering stabilizer, a specific hindered amine based weathering stabilizer, and a specific perinone based colorant.

Aromatic polycarbonate resins have been widely used as engineering plastics having high heat resistance, high impact resistance, and high transparency for various applications in the fields of automobiles, office equipment, and other apparatuses. In general, the aromatic polycarbonate resins are produced using raw materials derived from petroleum resources. Recent apprehension about the depletion of the petroleum resources has created a demand for the provision of plastic moldings made from raw materials derived from biomass resources such as plants. Further, there has been apprehension that the global warming caused by the increase in $CO_2$ emissions and the accumulation of $CO_2$ may result in climate change and other adverse phenomena. Therefore, there has been a need for the development of plastic moldings of a plastic which is made from a plant-derived monomer as a raw material and which is carbon neutral when disposed of after use. In particular, the development of such plastic moldings is strongly needed in the field of large moldings.

To address the need, polycarbonate resins of various types including plant-derived monomers as raw materials have been developed.

For example, it has been proposed to produce a polycarbonate resin by using isosorbide as a plant-derived monomer and through transesterification with diphenyl carbonate. (See, for example, GB 1079686.) Further, a polycarbonate resin produced by copolymerizing isosorbide with bisphenol A has been proposed as a copolymerized polycarbonate of isosorbide and another dihydroxy compound. (See, for example, Japanese Unexamined Patent Publication No. S56-55425). Furthermore, an attempt has been made to improve the stiffness of a homo-polycarbonate resin made of isosorbide, by copolymerizing isosorbide with aliphatic diol. (See, for example, WO 04/111106).

Moreover, it has been known that a molding can be produced from a mixture containing at least two selected from polycarbonate resins obtained by copolymerizing isosorbide with a dihydroxy compound and having different composition ratios. The mixture has high flowability and high heat resistance, and the resultant molding is resistant to defects in appearance such as a flow mark and a tiger mark which may be caused in the injection molding process, and has high impact resistance. (See Japanese Unexamined Patent Publication No. 2014-208800.)

In addition, it has been described that a molding with high transparency, weather resistance, and hue can be produced from a polycarbonate resin composition made of a polycarbonate resin using isosorbide and containing a hindered amine based light stabilizer. (See WO/2011/118768).

However, automotive interior and exterior members are further required to improve in weather resistance when used outdoor, in addition to heat and impact resistance. Therefore, when used as automotive interior and exterior members, the moldings described in Japanese Unexamined Patent Publication No. 2014-208800 and WO/2011/118768 are also required to improve in weather resistance when used outdoor, in addition to have high heat and impact resistance.

The present disclosure is conceived in view of the above requirements and intended to provide an automotive interior and exterior member with high heat, impact, and weather resistance.

SUMMARY

A study conducted by researchers showed that thermoplastic resin composition of the present disclosure can meet the requirements and finalized the present disclosure. The thermoplastic resin composition is obtained by melting and mixing polycarbonate copolymer containing structural units derived from dihydroxy compounds having a specific portion with a plurality of carbonate copolymers having different copolymerization ratios and butyl acrylate-methyl methacrylate-styrene based rubber, the thermoplastic resin composition including a specific hindered phenol based antioxidant, dibutylhydroxytoluene, 1,1,3-tris-(2-methyl-4-hydroxy-5-t-butylphenyl) butane, tris (2,4-di-t-butylphenyl) phosphite, bis (2,4-di-t-butylphenyl) pentaerythritol-diphosphite, a specific benzotriazole based weathering stabilizer, a specific hindered amine based weathering stabilizer, and a specific perinone based colorant.

Specifically, the present disclosure has features below.

[1] An automotive interior and exterior member comprising a polycarbonate resin composition, wherein the polycarbonate resin composition contains polycarbonate resin which is a composite including a plurality of carbonate copolymers each (i) including a structural unit (an ISB unit) derived from a dihydroxy compound represented by a general formula (1) below and a structural unit (a CHDM unit) derived from cyclohexanedimethanol and (ii) having a different copolymerization ratio, the ISB unit and the CHDM unit in the polycarbonate resin are contained in a molar ratio ranging from 67/33 to 69/31 (molar ratio), in the polycarbonate resin composition, (i) 4.9 parts by weight to 5.1 parts by weight of butyl acrylate-methyl methacrylate-styrene based rubber and (ii) components (A) to (H) in contents below are contained with respect to a total 100 parts by weight of the polycarbonate resin and the butyl acrylate-methyl methacrylate-styrene based rubber:

a component (A) containing 0.09 parts by weight to 0.11 parts by weight of a hindered phenol based antioxidant having a molecular weight ranging from 1100 to 1200;

a component (B) containing 0.001 parts by weight to 0.015 parts by weight of dibutylhydroxytoluene;

a component (C) containing 0.049 parts by weight to 0.051 parts by weight of 1,1,3-tris-(2-methyl-4-hydroxy-5-t-butylphenyl) butane;

a component (D) containing 0.049 parts by weight to 0.051 parts by weight of tris (2,4-di-t-butylphenyl) phosphite;

a component (E) containing 0.19 parts by weight to 0.21 parts by weight of bis (2,4-di-t-butylphenyl) pentaerythritol-diphosphite;

a component (F) containing 0.29 parts by weight to 0.31 parts by weight of a benzotriazole based weathering stabilizer having a melting point ranging from 102° C. to 106° C.;

a component (G) containing 0.09 parts by weight to 0.11 parts by weight of a hindered amine based weathering stabilizer having a melting point ranging from 125° C. to 130° C.; and a component (H) containing 0.05 parts by weight to 0.07 parts by weight of perinone based colorant having a melting point ranging from 252° C. to 258° C.

[Chem.1]

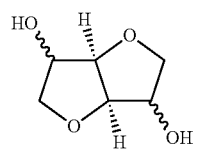

(1)

[2] The automotive interior and exterior member of [1] wherein the component (G) is the hindered amine based weathering stabilizer including a plurality of piperidine structures.

[3] The automotive interior and exterior member of [2] wherein the plurality of piperidine structures of the hindered amine based weathering stabilizer of the component (G) are linked to a single alkane chain via an ester linkage.

In the present disclosure, a specific thermoplastic resin composition is used for the automotive interior and exterior member, so that the member has high heat, impact, and weather resistance.

DETAILED DESCRIPTION

An embodiment of the present disclosure will now be described in detail. Note that the present disclosure is not limited to the following embodiment, but can be worked with various modifications made thereto, without departure from the gist of the present disclosure. In the present disclosure, the terms "% by weight" and "% by mass", "weight ppm" and "mass ppm", and "part by weight" and "part by mass" are the same in meanings.

The present disclosure relates to an automotive interior and exterior member made of a polycarbonate resin composition containing predetermined amounts of specific components.

[Polycarbonate Resin Composition]

The polycarbonate resin composition is a thermoplastic resin composition containing a predetermined amount of: a specific polycarbonate resin, butyl acrylate-methyl methacrylate-styrene based rubber, and a specific hindered phenol based antioxidant (a component (A)); dibutylhydroxytoluene (a component (B)); 1,1,3-tris-(2-methyl-4-hydroxy-5-t-butylphenyl) butane (a component (C)); tris (2,4-di-t-butylphenyl) phosphite (a component (D)); bis (2,4-di-t-butylphenyl) pentaerythritol-diphosphite (a component (E)); a specific benzotriazole based weathering stabilizer (a component (F)); a specific hindered amine based weathering stabilizer (a component (G)); and a specific perinone based colorant (a component (H)).

[Polycarbonate Resin]

The polycarbonate resin of this embodiment is a resin composite made of a melt mixture of a plurality of carbonate copolymers.

Each of the plurality of carbonate copolymers is a carbonate copolymer obtained through polymerization using a carbonate copolymer formed of structural units derived from two or more kinds of dihydroxy compounds; that is, using at least these two or more kinds of dihydroxy compounds.

Of the structural units derived from these two or more kinds of dihydroxy compounds, the structural units derived from the two kinds of dihydroxy compounds below are contained as essential structural units in all of the plurality of the carbonate copolymers.

One of the essential structural units is derived from a dihydroxy compound represented by a general formula (1) below as a dihydroxy compound. The other one is a structural unit derived from cyclohexanedimethanol (hereinafter also referred to as "a CHDM unit").

The polycarbonate resin is a resin composite obtained by melting and mixing a plurality of carbonate copolymers having different copolymerization ratios of the above polyol components, specifically different copolymerization ratios between the structural unit derived from the dihydroxy compound represented by the general formula (1) and the structural unit derived from cyclohexanedimethanol.

[Chem. 2]

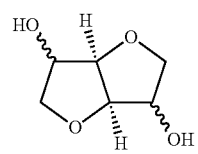

(1)

<Dihydroxy Compounds Having a Part Represented by Formula (1)>

Examples of dihydroxy compounds represented by Formula (1) above include isosorbide (ISB), isomannide, and isoidet which are in a stereoisomeric relationship.

One kind of these dihydroxy compounds represented by Formula (1) above may be used alone, or two or more kinds thereof may be used in combination.

In view of availability, ease in production, optical properties, and moldability, isosorbide is the most preferable of these dihydroxy compounds represented by Formula (1). Isosorbide exists as an abundant resource, is easy to obtain, and can be produced through dehydration and condensation of sorbitol made from various starches.

Hence, hereinafter, the structural unit derived from the dihydroxy compound represented by the general formula (1) above is referred to as a "structural unit (1)." The structural unit may also be referred to as an "ISB unit."

<Cyclohexanedimethanol>

Specific examples of the cyclohexanedimethanol described above include 1,2-cyclohexanedimethanol, 1,3-cyclohexanedimethanol, and 1,4-cyclohexanedimethanol.

<Diester Carbonate>

The carbonate copolymer described above can be produced by generally-used polymerization methods including an interfacial polymerization method involving use of phosgene, and a melt polymerization method involving a transesterification reaction with a diester carbonate, either of which may be used. However, it is preferable to use the melt polymerization method, in which a transesterification reaction is caused between the dihydroxy compound and a diester carbonate that is less environmentally toxic, in the presence of a polymerization catalyst.

In that case, the carbonate copolymer can be obtained by the melt polymerization method, in which the transesterification reaction is caused between the diester carbonate and the dihydroxy compound that includes at least the dihydroxy compound represented by the general formula (1) shown above and cyclohexanedimethanol.

Among some usable diester carbonates, one represented by Formula (2) shown below is used usually. One kind of the diester carbonate may be used alone, or two or more kinds thereof may be used in combination.

[Chem. 3]

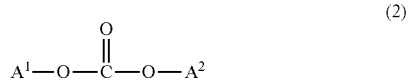

(2)

In Formula (2) shown above, $A^1$ and $A^2$ are independently substituted or unsubstituted aliphatic groups having 1 to 18 carbons, or substituted or unsubstituted aromatic groups.

Non-limiting examples of the diester carbonates represented by Formula (2) above include substituted diphenyl carbonates such as diphenyl carbonate and ditolyl carbonate, dimethyl carbonate, diethyl carbonate, and di-t-butyl carbonate. Among them, substituted diphenyl carbonates including diphenyl carbonate are preferable, and diphenyl carbonate is particularly preferable. Note that a diester carbonate may include impurities such as chloride ions. The impurities may inhibit the polymerization reaction, or deteriorate the hue of the obtained carbonate copolymer. It is therefore preferable to use a diester carbonate purified by, for example, distillation, as necessary.

The diester carbonate is preferably used, with respect to all dihydroxy compounds used for the melt polymerization, in a molar ratio preferably from 0.90 to 1.20, more preferably from 0.95 to 1.10, still more preferably from 0.96 to 1.10, and particularly preferably from 0.98 to 1.04.

If the molar ratio is less than 0.90, a terminal hydroxyl group of the produced carbonate copolymer increases to deteriorate the thermal stability of the polymer. As a result, coloration may be caused during the molding process of the polycarbonate resin composition, the speed of the transesterification reaction may be slowed, or it becomes impossible to obtain a desired high molecular weight member resin.

If the molar ratio is greater than 1.20, the speed of the transesterification reaction is slowed under the same condition, and it becomes difficult to produce a carbonate copolymer having a desired molecular weight. In addition, the produced carbonate copolymer contains an increased amount of the residual diester carbonate, which may adversely cause an odor during the molding process or of the produced molding. The residual diester carbonate may increase thermal hysteresis during the polymerization reaction, and consequently, may deteriorate the hue and the weather resistance of the obtained polycarbonate resin.

Furthermore, an increase in the molar ratio of the diester carbonate with respect to all of dihydroxy compounds results in an increase in the amount of the residual diester carbonate in the obtained carbonate copolymer. The increase in residual diester carbonate is not preferable since the diester carbonate absorbs ultraviolet radiation, causing possible deterioration in weather resistance of the carbonate copolymer. The polycarbonate resin remains in the polycarbonate resin of this embodiment at a concentration of preferably 200 weight ppm or less, more preferably 100 weight ppm or less, still more preferably 60 weight ppm or less, and yet more preferably 30 weight ppm or less. However, a carbonate copolymer may actually include an unreacted diester carbonate. The lower limit of the concentration of an unreacted diester carbonate in a polycarbonate resin is usually 1 weight ppm.

<Transesterification Reaction Catalyst>

The carbonate copolymer in this embodiment can be produced through transesterification between (i) an dihydroxy compound including the structural unit (1) and cyclohexanedimethanol, and (ii) the diester carbonate represented by Formula (2) above. More specifically, the carbonate copolymer in this embodiment can be produced by causing the transesterification reaction and removing by-products such as a monohydroxy compound outside the system. In this case, the melt polymerization is usually carried out through the transesterification reaction in the presence of a transesterification reaction catalyst.

Examples of the transesterification reaction catalyst (hereinafter referred to also as "the catalyst") useable for the production of the carbonate copolymer of this embodiment include, for example, a metal compound of Group 1 or Group 2 specified in the long-form periodic table (Nomenclature of Inorganic Chemistry IUPAC Recommendations 2005) (hereinafter simply referred to as "Group 1" and "Group 2"), and basic compounds such as a basic boron compound, a basic phosphorus compound, a basic ammonium compound, and an amine based compound. Among these compounds, the metal compound of Group 1 and/or the metal compound of Group 2 are preferably used.

It is possible to use the basic compounds such as a basic boron compound, a basic phosphorus compound, a basic ammonium compound, and an amine based compound in an auxiliary manner, in combination with the metal compound of Group 1 and/or the metal compound of Group 2. However, it is particularly preferable to use the metal compound of Group 1 and/or the metal compound of Group 2 alone.

The metal compound of Group 1 and/or the metal compound of Group 2 may be used usually in the form of a hydroxide or in the form of salts such as carbonate, carboxylate, and phenolate. In view of availability and ease in handling, the forms of a hydroxide, a carbonate, and an acetate are preferable. To improve the hue and the polymerization activity, the form of an acetate is preferable.

Examples of the metal compound of Group 1 include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium phenylboron, potassium phenylboron, lithium phenylboron, cesium phenylboron, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, sodium alcoholate, potassium alcoholate, lithium alcoholate, cesium alcoholate, phenolate, and disodium salt, dipotassium salt, dilithium salt and dicesium salt of bisphenol A. In particular, the cesium compounds and the lithium compounds are preferable.

Examples of the metal compound of Group 2 include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among them, the magnesium compounds, the calcium compounds, and the barium compounds are preferable, and the magnesium compounds and/or the calcium compounds are more preferable.

Examples of the basic boron compound include sodium salt, potassium salt, lithium salt, calcium salt, barium salt, magnesium salt or strontium salt such as tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compound include triethylphosphine, tri-n-propylphosphine, triisopropylphosphine, tri-n-butylphosphine, triphenylphosphine, tributylphosphine, and a quaternary phosphonium salt.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine based compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

To make the obtained polycarbonate resin excellent in various properties such as the transparency, hue, and weather resistance, it is preferable to use, as the catalyst, at least one metal compound selected from the group consisting of the metal compounds of Group 2 and the lithium compounds.

To allow the carbonate copolymer to be particularly excellent in the transparency, hue, and weather resistance, the catalyst is preferably comprised of at least one metal compound selected from the group consisting of the magnesium compounds, the calcium compounds, and the barium compounds, and is more preferably comprised of at least one metal compound selected from the group consisting of the magnesium compounds and the calcium compounds.

If the catalyst is comprised of the metal compound of Group 1 and/or the metal compound of Group 2, the amount of the catalyst to be used, in terms of a metal equivalent, ranges preferably from 0.1 µmol to 300 µmol, more preferably from 0.1 µmol to 100 µmol, still more preferably from 0.5 µmol to 50 µmol, and still yet more preferably from 1 µmol to 25 µmol, with respect to 1 mol of all dihydroxy compounds to be subjected to the reaction.

If a compound including at least one metal selected from the group consisting of the metals of Group 2 is used as the catalyst, the amount to be used is, in terms of a metal equivalent, preferably 0.1 µmol or more, more preferably from 0.5 µmol or more, and particularly preferably 0.7 µmol or more, with respect to 1 mol of all dihydroxy compounds to be subjected to the reaction. The upper limit of the amount is preferably 20 µmol, more preferably 10 µmol, particularly preferably 3 µmol, and most preferably 2.0 µmol.

An excessively small amount of the catalyst used makes it impossible to achieve the polymerization activity required for producing a carbonate copolymer having a desired molecular weight, which may result in obtainment of insufficient fracture energy. On the other hand, an excessively large amount of the catalyst used not only deteriorates the hue of the obtained carbonate copolymer, but also produces by-products which reduce the flowability or increase generation of gels. This may cause brittle fracture, and make it difficult to produce a carbonate copolymer of desired quality.

<Method for Producing Carbonate Copolymer>

The carbonate copolymer described above can be produced by the transesterification between, and the melt polymerization of, a diester carbonate and a dihydroxy compound including the dihydroxy compound represented by the general formula (1) shown above and cyclohexanedimethanol. It is preferable to uniformly mix the materials, i.e., the dihydroxy compound and the diester carbonate, together before the transesterification reaction.

The mixing of the materials is carried out at a temperature of usually 80° C. or above, and preferably 90° C. or above. The upper limit of the temperature is usually 250° C. or below, preferably 200° C. or below, and still more preferably 150° C. or below. It is particularly favorable to carry out the mixing at a temperature ranging from 100° C. to 120° C. Mixing carried out at an excessively low temperature may slow the dissolution speed or cause insufficient solubility, and often result in inconvenience such as solidification. Mixing carried out at an excessively high temperature may cause thermal degradation of the dihydroxy compound, and as result, may deteriorate the hue of the obtained polycarbonate resin and adversely affect its weather resistance.

In one preferred embodiment, the carbonate copolymer is produced through multi-stage melt polymerization using the catalyst and a plurality of reactors.

The mode of reaction may be any of a batch mode, a continuous mode, or a combination thereof.

Further, it is effective to use a reflux condenser in the polymerization reactor for the purpose of reducing the amount of monomer to be distilled out. In particular, it is significantly effective to employ such a reflux condenser in the reactor for the early stages of the polymerization in which a large amount of an unreacted monomer component is present.

Choice of the amount and kind of the catalyst described above is important for preventing the deterioration of the hue, the thermal stability, and the weather resistance of the finally produced polycarbonate resin (a mixture of carbonate copolymer), and at the same time, for maintaining an appropriate polymerization speed and reducing the distilling-out of the monomer.

If two or more reactors are to be used, the production of the carbonate copolymer described above may be carried out such that multiple reaction stages under different conditions are further performed in each reactor or the temperature and pressure inside each reactor are varied continuously, for example.

For the production of the carbonate copolymer, the catalyst may be added to a feed preparation tank or a feed reservoir. Alternatively, the catalyst may be added directly to the reactor. To stabilize the supply of the catalyst and control the melt polymerization, it is preferable to provide a catalyst supply line at an intermediate portion of a raw material line upstream of the reactors and to supply the catalyst in the form of an aqueous solution from the catalyst supply line.

The polymerization conditions are preferably set such that in the early stages of the polymerization, a prepolymer is obtained at a relatively low temperature and in a low vacuum, and in the latter stages of the polymerization, the molecular weight is increased to a desired value at a relatively high temperature and in a high vacuum. However, in view of the hue and weather resistance of the obtained polycarbonate resin, it is important to appropriately set a jacket temperature and an inner temperature in each molecular weight stage and a pressure in the reaction system. For example, if at least one of the temperature or the pressure is varied too early before the polymerization reaction reaches a predetermined value, an unreacted monomer is distilled out and the molar ratio between the dihydroxy compound and the diester carbonate is varied adversely, causing a decrease in the polymerization speed or rendering it impossible to obtain a polymer having a predetermined molecular weight and a predetermined terminal group. As a result, the object of the present disclosure cannot be achieved.

If the transesterification reaction occurs at an excessively low temperature, the productivity decreases and the thermal hysteresis of the product increases. If the transesterification reaction occurs at an excessively high temperature, the monomer vaporizes, and additionally, decomposition and coloration of the carbonate copolymer may be facilitated.

To produce the carbonate copolymer described above, the method of causing transesterification reaction between the diester carbonate and the dihydroxy compound including the dihydroxy compound represented by the general formula (1) shown above and cyclohexanedimethanol in the presence of the catalyst is usually performed by a multistage process consisting of two or more stages.

If the transesterification reaction temperature is excessively high, the resultant molding may have deteriorated hue and become liable to brittle fracture. If the transesterification reaction temperature is excessively low, the molecular weight may not increase to reach a target value, molecular weight distribution may widen, and an insufficient impact strength may be obtained. If the residence time of the transesterification reaction is excessively long, the resultant molding may become liable to brittle fracture. If the residence time is excessively short, the molecular weight may not increase to reach the target value, and an insufficient impact strength may be obtained.

In particular, to obtain a favorable carbonate copolymer having a high impact strength while reducing the coloration, thermal degradation, or burn marks of the carbonate copolymer, the upper limit of the inner temperature of the reactors in all of the reaction stages is set to preferably below 255° C., more preferably 250° C. or below, and particularly preferably from 225° C. to 245° C. To reduce a decrease in the polymerization speed in the latter stages of the carbonate copolymer and to minimize the thermal degradation of the polycarbonate resin due to the thermal hysteresis, it is preferable to use a horizontal reactor which has a high plug flowability and a high interface renewal performance in a final stage of the reaction.

The metals of Group 1, specifically lithium, sodium, potassium, and cesium, in particular, sodium, potassium, and cesium may enter a polycarbonate resin, not only from the catalyst used, but also from the raw material and the reaction apparatus. If a large amount of these metals is contained in a polycarbonate resin, the hue of the polycarbonate resin may be affected adversely. It is therefore preferable that the polycarbonate resin of this embodiment includes a small total content of these compounds. Specifically, the total content in terms of a metal content in the polycarbonate resin is usually 1 weight ppm or less, preferably 0.8 weight ppm or less, and more preferably 0.7 weight ppm or less.

A metal content in a polycarbonate resin (the mixture of carbonate copolymer) can be measured by various known methods. For example, the metals contained in a polycarbonate resin are collected by wet ashing or other methods, and then, the collected metals may be measured by atomic emission spectroscopy, atomic absorption spectrometry, Inductively Coupled Plasma (ICP), or other methods.

After the melt polymerization described above, the carbonate copolymer of this embodiment is usually cooled and solidified, and pelletized by a rotary cutter or other devices.

Examples of the pelletizing method include, but are not limited to: a method in which the polycarbonate resin in a melted state is taken out from a final polymerization reactor, cooled and solidified in the shape of a strand, and then pelletized; a method in which the polycarbonate resin in a melted state is supplied from a final polymerization reactor to a single- or double-shaft extruder, subjected to melt extrusion, and cooled and solidified to be pelletized; and a method in which the polycarbonate resin in a melted state is taken out from a final polymerization reactor, cooled and solidified in the shape of a strand, and then once pelletized, thereafter, the resin is supplied again to a single- or double-shaft extruder, subjected to melt extrusion, and cooled and solidified to be pelletized.

When the above methods are implemented, the residual monomer can be evaporated under reduced pressure in the extruder. Alternatively, at least one of commonly known additives such as a thermal stabilizer, a neutralizing agent, a UV absorber, a mold release agent, a coloring agent, an anti-static agent, an internal lubricant, an external lubricant, a plasticizer, a compatibilizer, and a fire retardant may be added and kneaded in the extruder.

The temperature for melt kneading in the extruder depends on the glass-transition temperature and molecular weight of the carbonate copolymer. The temperature for melt kneading ranges usually from 150° C. to 300° C., preferably from 200° C. to 270° C., and more preferably 230° C. to 260° C. If the temperature for melt kneading is lower than 150° C., the carbonate copolymer has a high melt viscosity to apply a large load on the extruder, resulting in a decrease in the productivity. If the temperature for melt kneading is higher than 300° C., the carbonate copolymer suffers severe thermal degradation, resulting in not only a decrease in the mechanical strength due to a decrease in the molecular weight, but also coloration, and generation of gas, unwanted by-products, and burn marks. A filter for removing the unwanted by-products and the burn marks is preferably provided inside or at the outlet of the extruder.

The carbonate copolymer produced in the above manner may contain one kinds or two or more kinds of thermal stabilizers for the purpose of preventing a decrease in the molecular weight and deterioration of the hue during, for example, the molding process.

Examples of such thermal stabilizer include phosphorous acid, phosphoric acid, phosphonous acid, and phosphonic acid.

The thermal stabilizer may further be additionally blended, in addition to the amount added at the melt polymerization. Specifically, following the obtainment of a polycarbonate resin by blending an appropriate amount of a phosphite compound and a phosphate compound, a phosphite compound can be further blended by a blending method which will be described later. As a result, a large amount of the thermal stabilizer can be blended while a decrease in the transparency, the occurrence of coloration, and a decrease in the heat resistance are avoided at the polymerization, and deterioration of the hue can be prevented.

The amount of the thermal stabilizer blended is preferably from 0.0001 to 1 part by weight, more preferably from 0.0005 to 0.5 parts by weight, still more preferably from 0.001 to 0.2 parts by weight, with respect to 100 parts by weight of the carbonate copolymer.

<Physical Properties of Polycarbonate Resin (or Carbonate Copolymer)>

Preferable physical properties of the polycarbonate resin (or the carbonate copolymer) of this embodiment are described below.

(Glass Transition Temperature)

A glass transition temperature of the polycarbonate resin (or the carbonate copolymer) of this embodiment is below 145° C. If the glass transition temperature of the polycarbonate resin (or the carbonate copolymer) is excessively high to go beyond this range, the coloration may easily occur and the enhancement of the impact strength may become difficult. In addition, in such a case, when the shape of a mold surface is transferred to the molding in the molding process, the temperature of the mold needs to be set high. As a result, the range of selectable temperature regulating devices may be limited, or, the mold surface may be transferred less suitably.

The glass transition temperature of the polycarbonate resin (or the carbonate copolymer) of this embodiment is, more preferably, below 140° C., and still more preferably, below 135° C.

The glass transition temperature of the polycarbonate resin (or the carbonate copolymer) of this embodiment is usually 90° C. or above, and preferably 95° C. or above.

The polycarbonate resin (or the carbonate copolymer) of this embodiment is made to have a glass transition temperature lower than 145° C. by, for example: reducing the ratio of the structural unit (1) in the polycarbonate resin (or the carbonate copolymer); selecting an alicyclic dihydroxy compound having a low heat resistance as a dihydroxy compound for use in the production of the polycarbonate resin (or the carbonate copolymer); or reducing the ratio of a structural unit derived from an aromatic series dihydroxy compound such as a bisphenol compound, in the polycarbonate resin (or the carbonate copolymer).

Note that the glass transition temperature of the polycarbonate resin (or the carbonate copolymer) of this embodiment is measured by a method which will be described later in examples.

(Reduced Viscosity)

A degree of polymerization of the polycarbonate resin (or the carbonate copolymer) of this embodiment is preferably 0.40 dl/g or more, more preferably 0.42 dl/g or more, and particularly preferably 0.45 dl/g or more, in terms of a reduced viscosity (hereinafter referred to simply as "the reduced viscosity"). Here, this reduced viscosity is measured using, as a solvent, a mixed solvent containing phenol and 1,1,2,2-tetrachloroethane at a mass ratio of 1:1, and the polycarbonate resin at a concentration precisely adjusted to 1.00 g/dl, at a temperature of 30.0° C.±0.1° C. However, the polycarbonate resin composition of this embodiment having a reduced viscosity greater than 0.60 dl/g, or even greater than 0.85 dl/g or more may be used suitably, depending on the application of the polycarbonate resin composition. The reduced viscosity of the polycarbonate resin of this embodiment is preferably 2.0 dl/g or less, more preferably 1.7 dl/g or less, and particularly preferably 1.4 dl/g or less. An excessively low reduced viscosity of the polycarbonate resin may result in a decrease in the mechanical strength, whereas an excessively high reduced viscosity of the polycarbonate resin may reduce the flowability in the molding process, deteriorate the cycle properties, increase distortion of the molding, and make the molding more liable to thermal deformation.

<Production of Polycarbonate Resin (Mixture of Carbonate Copolymer)>

The polycarbonate resin of this embodiment is made of a plurality of carbonate copolymers melted and mixed together. Each of the carbonate copolymers has a different copolymerization ratio. A temperature for the melting and mixing, in terms of a temperature of the resin at a melt extruding outlet, is suitably from 235° C. to 245° C., and preferably from 238° C. to 242° C. Setting the temperature within this range can reduce the coloration and thermal degradation or burn marks of the polycarbonate resin, and enables production of the favorable polycarbonate resin having a high impact strength.

The range of the copolymerization ratio of each of the plurality of carbonate copolymers having a different copolymerization ratio and a mixing ratio between the plurality of polycarbonate copolymers are appropriately chosen under conditions in which the copolymerization ratio of the polycarbonate resin mixture obtained through the mixing (a copolymerization ratio of the polycarbonate resin mixture obtained through averaging different carbonate copolymers with the copolymerization ratio) is within a predetermined range. As the copolymerization ratio of the polycarbonate resin mixture obtained through the mixing, the amount (number of moles) of the ISB unit accounts for 67 mol % or more, and preferably 67.5 mol % or more of the total amount (number of moles) of the sum of the ISB unit and the CHDM unit. The upper limit of the ratio is 69 mol % or less, and preferably 68.5 mol % or less. Furthermore, the amount (number of moles) of the CHDM unit accounts for 31 mol % or more, and preferably 31.5 mol % or more of the total amount (number of moles) described above. The upper limit of the ratio is 33 mol % or less, and preferably 32.5 mol % or less.

If the amount of the ISB unit accounts for less than 67 mol % of the total amount (number of moles) described above (i.e. if the amount of the CHDM unit accounts for less than 33 mol % of the total amount (number of moles) described above), the heat resistance may be reduced adversely. On the other hand, if the amount of the ISB unit accounts for less than 69 mol % of the total amount (number of moles) described above (i.e. if the amount of the CHDM unit accounts for less than 31 mol % of the total amount (number of moles) described above), the impact resistance may be reduced adversely.

<Butyl Acrylate-Methyl Methacrylate-Styrene Series Rubber>

The above polycarbonate resin composition is made of the polycarbonate resin containing butyl acrylate-methyl methacrylate-styrene based rubber. In this specification, the "butyl acrylate-methyl methyl methacrylate-styrene based rubber" is hereinafter referred to as "BA-MA-S rubber" as appropriate.

A core-shell-type graft copolymer is preferable as the BA-MA-S rubber. The core-shell-type graft copolymer is usually formed by graft-copolymerizing a polymer component which is called a rubber component and forms a core layer, with a monomer component which is copolymerizable with the polymer component and forms a shell layer. Specifically, the BA-MA-S rubber preferably contains the core layer made of the polymer component and the shell layer covering the core layer. The shell layer preferably contains the monomer component copolymerizable with the polymer of the core layer. This monomer component is preferably graft-copolymerized with the polymer component of the core layer.

The core-shell-type graft copolymer may be produced by any polymerization method such as mass polymerization, solution polymerization, suspension polymerization, or emulsion polymerization. The copolymerization may be of single step grafting or multistep grafting. The BA-MA-S rubber such as the core-shell-type copolymer may usually be a commercially available one. Examples of the commercially available product include, but not limited to, the items below.

The items include, for example, Kane Ace M-590 (trade name) produced by Kaneka Corporation, Meta Bren Meta Bren W-341 and W-377, and Meta Bren W-341 (trade names) produced by Mitsubishi Rayon Co., Ltd., and Acrypet IR377, IR441, and IR491 (trade names) produced by Mitsubishi Rayon Co., Ltd. Among these items, Kane Ace M-590 (trade name) produced by Kaneka Corporation is most preferable because of its high refractive index and heat resistance.

The monomer component that forms the shell layer and can be graft-copolymerized with the polymer component forming the core layer is (meth) acrylic ester compound. Specifically, the monomer component is butyl acrylate and methyl methacrylate. Here, "(meth) acryl" is a general term for "acryl" and "methacryl."

Preferably, the core-shell-type graft copolymer includes a butyl acrylate-styrene copolymer component in a ratio of preferably 40% by weight or more, and more preferably 60% by weight or more. The core-shell-type graft copolymer preferably includes the (meth) acrylic ester component in a ratio of 10% by weight or more. Here, in the core-shell-type graft copolymer, the "butyl acrylate-styrene copolymer" portion corresponds to the core layer.

One kind of the BA-MA-S rubber comprised of the core-shell-type graft copolymer may be used alone, or two or more kinds thereof may be used in combination.

In the above polycarbonate resin composition, the content of the butyl acrylate-methyl methacrylate-styrene based rubber (the BA-MA-S rubber) may suitably be 4.9 parts by weight, and preferably 4.95 parts by weight when the sum of the polycarbonate resin and the butyl acrylate-methyl methacrylate-styrene based rubber is 100 parts by weight. Furthermore, the upper limit of the content is suitably 5.1 parts by weight, and preferably 5.05 parts by weight. If the content exceeds the above range, the heat resistance could deteriorate, possibly causing a problem that the heat resistance is insufficient for use in an automotive interior and exterior member and a component of an outboard engine. Moreover, the insufficient heat resistance could adversely affect the appearance of the automotive interior and exterior member and the component of the outboard engine.

[Method for Producing Polycarbonate Resin Composition]

The polycarbonate resin composition can be produced of polycarbonate resin, butyl acrylate-methyl methacrylate-styrene based rubber (BA-MA-S rubber) and an additive to be described later melted and mixed together. Specifically, first, for example, several kinds of the polycarbonate copolymer in the form of pellets, the butyl acrylate-methyl methacrylate-styrene based rubber (the BA-MA-S rubber) and various kinds of the additive are mixed together and extruded in the form of strands, using an extruder. Next, the extruded resin composition is cut in the form of pellets, using, for example, a rotary cutter. Hence, obtained is polycarbonate resin composition in the form of, for example, pellets.

As described above, examples of this additive include: a specific hindered phenol based antioxidant (the component (A)); dibutylhydroxytoluene (the component (B)); 1,1,3-tris-(2-methyl-4-hydroxy-5-t-butylphenyl) butane (the component (C)); tris (2,4-di-t-butylphenyl) phosphite (the component (D)); bis (2,4-di-t-butylphenyl) pentaerythritol-diphosphite (the component (E)); a specific benzotriazole based weathering stabilizer (the component (F)); a specific hindered amine based weathering stabilizer (the component (G)); and a specific perinone based colorant (the component (H)).

[Component (A) (Specific Hindered Phenol based Antioxidant)]

The polycarbonate resin composition of this embodiment contains as the component (A) a hindered phenol based antioxidant having a specific molecular weight.

The molecular weight of the hindered phenol based antioxidant is essentially 1100 and more, and preferably 1120 and more. If the molecular weight is smaller than 1100, the antioxidant could be insufficient in reducing deterioration by oxidization. Meanwhile, the upper limit of the molecular weight is suitably 1200, and preferably 1180. If the molecular weight is greater than 1200, the compatibility of the antioxidant as a resin composition could deteriorate.

An example of the hindered phenol based antioxidant having a molecular weight ranging from 1100 to 1200 includes such a compound as pentaerythritol-tetrakis [3-(3, 5-di-tert-butyl-4-hydroxylphenyl) propionate].

The content of the component (A) is suitably 0.09 parts by weight or more, preferably 0.094 parts by weight or more, and more preferably, 0.096 parts by weight or more with respect to the total 100 parts by weight of the polycarbonate resin and the butyl acrylate-methyl methacrylate-styrene based rubber of this embodiment. Blending the component (A) greater in amount than the above range is preferable because it makes it easy to improve surface impact resistance and impact resistance. On the other hand, the upper limit of the amount of the component (A) blended is suitably 0.11 parts by weight or less, preferably 0.108 parts by weight or less, and more preferably 0.106 parts by weight or less. It is preferable to blend the component (A) in the above range or less in amount for the appearance of the molding, i.e. the automotive interior and exterior member according to the present disclosure.

[Component (B) (Dibutylhydroxytoluene)]

The polycarbonate resin composition of this embodiment includes dibutylhydroxytoluene as the component (B). The dibutylhydroxytoluene included curbs reduction in the molecular weight of the resin composition during a weather resistance test, i.e., contributes to improvement in the weather resistance of the resin composition.

The content of the component (B) is preferably 0.001 parts by weight or more, and more preferably, 0.003 parts by weight or more with respect to the total 100 parts by weight of the polycarbonate resin and the butyl acrylate-methyl methacrylate-styrene based rubber of this embodiment. If the content of the component (B) is less than the above range, the effect of curbing the reduction in the molecular weight during the weather resistance test may be insufficient. On the other hand, the upper limit of the content of the component (B) is suitably 0.015 parts by weight or less, and preferably 0.011 parts by weight or less. If the content of the component (B) is more than the above range, more deposit may be left on the mold.

Component (C) (1,1,3-tris-(2-methyl-4-hydroxy-5-t-butylphenyl) butane)

The polycarbonate resin composition of this embodiment includes 1,1,3-tris-(2-methyl-4-hydroxy-5-t-butylphenyl) butane as the component (C). The 1,1,3-tris-(2-methyl-4-hydroxy-5-t-butylphenyl) butane included curbs reduction in the molecular weight of the resin composition during a weather resistance test, i.e., contributes to improvement in the weather resistance of the resin composition.

The content of the component (C) is preferably 0.049 parts by weight or more, and more preferably, 0.0495 parts by weight or more with respect to the total 100 parts by weight of the polycarbonate resin and the butyl acrylate-methyl methacrylate-styrene based rubber of this embodiment. If the content of the component (C) is below the above range, the effect of curbing the reduction in the molecular weight during the weather resistance test may be insufficient. On the other hand, the upper limit of the content of the component (C) is suitably 0.051 parts by weight or less, and preferably 0.05 parts by weight or less. If the content of the component (C) is more than the above range, more deposit may be left on the mold.

Component (D) (Tris (2,4-di-t-butylphenyl) phosphite)

The polycarbonate resin composition of this embodiment includes tris (2,4-di-t-butylphenyl) phosphite as the component (D).

The content of the component (D) is preferably 0.049 parts by weight or more, and more preferably, 0.0495 parts by weight or more with respect to the total 100 parts by weight of the polycarbonate resin and the butyl acrylate-methyl methacrylate-styrene based rubber of this embodiment. Including the component (D) greater in amount than the above range is preferable because it makes it easy to improve surface impact resistance and impact resistance. On the other hand, the upper limit of the content of the component (D) is suitably 0.051 parts by weight or less, and preferably 0.050 parts by weight or less. It is preferable to include the component (D) in the above range or less in amount for the appearance and the heat resistance of the molding, i.e. the automotive interior and exterior member, according to the present disclosure.

Component (E) (Bis (2,4-di-t-butylphenyl) pentaerythritol-diphosphite)

The polycarbonate resin composition of this embodiment includes bis (2,4-di-t-butylphenyl) pentaerythritol-diphosphite as the component (E).

The content of the component (E) is preferably 0.19 parts by weight or more, and more preferably, 0.195 parts by weight or more with respect to the total 100 parts by weight of the polycarbonate resin and the butyl acrylate-methyl methacrylate-styrene based rubber of this embodiment. Including the component (E) greater in amount than the above range is preferable because it makes it easy to improve surface impact resistance and impact resistance. On the other hand, the upper limit of the content of the component (E) is suitably 0.21 parts by weight or less, and preferably 0.205 parts by weight or less. It is preferable to include the component (E) in the above range or less in amount for the appearance and the heat resistance of the molding, i.e. the automotive interior and exterior member according to the present disclosure.

[Component (F) (Benzotriazole Based Weathering Stabilizer Having a Predetermined Melting Point)]

The polycarbonate resin composition of this embodiment includes a benzotriazole based weathering stabilizer having a predetermined melting point as the component (F). This weather stabilizer included curbs reduction in the molecular weight of the resin composition during a weather resistance test.

The melting point of the benzotriazole based weathering stabilizer is essentially 100° C. or above, and preferably 102° C. or above. If the melting point is below 100° C., the weather resistance may be low. On the other hand, the upper limit of the melting point is suitably 106° C. or below, and preferably 104° C. or below. If the melting point is above 106° C., the polycarbonate resin composition could not achieve the weather resistance when actually exposed in natural environments.

A more specific example of the benzotriazole based weathering stabilizer having a melting point ranging from 102° C. to 106° C. includes 2-(2H-benzotriazole-2-yl)-4-(1,1,3,3-tetramethylbutyl) phenol.

The content of the component (F) is preferably 0.29 parts by weight or more, and more preferably, 0.295 parts by weight or more with respect to the total 100 parts by weight of the polycarbonate resin and the butyl acrylate-methyl methacrylate-styrene based rubber of this embodiment. If the content of the component (F) is less than 0.29 parts by weight, the effect of curbing reduction in the molecular weight during the weather resistance test may be insufficient. On the other hand, the upper limit of the content of the component (F) is suitably 0.31 parts by weight or less, and preferably 0.305 parts by weight or less. If the content of component (F) is more than 0.31 parts by weight, more deposit may be left on the mold.

[Component (G) Hindered Amine Based Weathering Stabilizer Having a Predetermined Melting Point]

The polycarbonate resin composition of this embodiment includes a hindered amine based weathering stabilizer having a predetermined melting point as the component (G). The hindered amine series weathering stabilizer included curbs reduction in the molecular weight of the resin composition during a weather resistance test.

The melting point of the hindered amine based weathering stabilizer is essentially 125° C. or above, and preferably 127° C. or above. If the melting point is below 125° C., the weather resistance may be low. On the other hand, the upper limit of the melting point is suitably 130° C. or below, and preferably 129° C. or below. If the melting point is above 130° C., compatibility of the polycarbonate resin composition as a resin composition may deteriorate.

The hindered amine based weathering stabilizer having a melting point ranging from 125° C. to 130° C. preferably has a structure in which nitride forms part of a cyclic structure, and more preferably has a piperidine structure. The piperidine structure specified herein may be any structure as long as it is a saturated 6-membered cyclic amine structure. The piperidine structure includes a piperidine structure a part of which is substituted by a substituent. Examples of the substituent which the piperidine structure may have include alkyl groups having 4 or less carbons. In particular, methyl groups are preferable. A compound having a plurality of piperidine structures is more preferable as an amine compound. If the amine compound has a plurality of piperidine structures, the plurality of piperidine structures are preferably linked to a single alkane chain via an ester linkage. A specific example of the hindered amine based weathering stabilizer is a compound represented by Formula (3) below.

[Chem. 4]

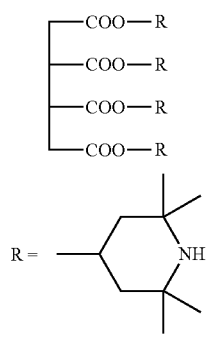

(3)

The content of the component (G) is preferably 0.09 parts by weight or more, and more preferably, 0.095 parts by weight or more with respect to the total 100 parts by weight of the polycarbonate resin and the butyl acrylate-methyl methacrylate-styrene based rubber of this embodiment. If the content of the component (G) is less than 0.09 parts by weight, the effect of curbing reduction in the molecular weight during the weather resistance test may be insufficient. On the other hand, the upper limit of the content of the component (G) is suitably 0.11 parts by weight or less, and preferably 0.105 parts by weight or less. If the content of component (G) is more than 0.11 parts by weight, more deposit may be left on the mold.

[Component (H) Perinone Based Colorant Having a Predetermined Melting Point]

The polycarbonate resin composition of this embodiment includes a perinone based colorant having a predetermined melting point as the component (H). Including the perinone based colorant makes it possible to achieve the effect of this embodiment. Examples of the perinone based colorant include Solvent Orange 60, Solvent Red 7, Solvent Red 179, and Solvent Violet 29.

The melting point of the perinone based colorant is essentially 252° C. or above, and preferably 253° C. or above. If the melting point is below 253° C., the weather resistance may deteriorate. On the other hand, the upper limit of the melting point is suitably 258° C. or below, and preferably 256° C. or below. If the melting point is above 258° C., compatibility of the polycarbonate resin composition may deteriorate.

An example of the perinone based colorant having a melting point ranging from 252° C. to 258° C. includes Solvent Red 179.

The content of the component (H) is preferably 0.05 parts by weight or more, and more preferably, 0.055 parts by weight or more with respect to the total 100 parts by weight of the polycarbonate resin and the butyl acrylate-methyl methacrylate-styrene based rubber of this embodiment. If the content is less than 0.05 parts by weight, it is not preferable because the blackness of the resin and rubber decreases. On the other hand, the upper limit of the content of the component (H) is suitably 0.07 parts by weight or less, and preferably 0.065 parts by weight or less. If the content is more than 0.07 parts by weight, it is not preferable because the weather resistance of the resin and rubber deteriorates.

[Method for Producing Polycarbonate Resin Composition]

The several kinds of polycarbonate copolymer, butyl acrylate-methyl methacrylate-styrene based rubber, and the components (A) to (H) may be mixed and kneaded together using, for example, a tumbler, a V-type blender, a super mixer, a Nauta mixer, a Banbury mixer, a kneading roll, or an extruder, or may be mixed by a solution blending method in which the components dissolved together in a common good solvent such as methylene chloride are mixed together. However, these are merely examples, and any commonly-used blending method may be used.

Specifically, for example, the polycarbonate copolymer in the form of pellets and the various kinds of components are mixed in an extruder, the mixture is extruded in the shape of a strand, and the extruded mixture is cut into pellets with a rotary cutter or other devices, thereby producing the thermoplastic resin composition of this embodiment.

The polycarbonate resin composition of this embodiment obtained in this manner includes the components mixed together, and may be molded in a desired shape, directly or after being pelletized with an extruder, using a known molding method such as extrusion molding, injection molding, or compression molding.

[Polycarbonate Resin Molding]

The automotive interior and exterior member of this embodiment can be produced by molding the polycarbonate resin composition of this embodiment.

In one preferred embodiment, the automotive interior and exterior member of this embodiment is molded by injection molding.

Employing the injection molding enables the automotive interior and exterior member of this embodiment to be molded in a complicated shape.

EXAMPLES

Next, the present disclosure is described in more detail with reference to examples. Note that the following examples are not intended to limit the present disclosure in any way. First, an evaluation method is described.

<Evaluation Method>

(1) Charpy Impact Strength

In compliance with ISO 179 (2000), the ISO specimens for mechanical property were subjected to the Charpy impact test of notched type. The value of the Charpy impact test increases with increase in the impact resistance of the specimen.

(2) Measurement of Load Deflection Temperature

Pellets of the polycarbonate resin composition were dried at 90° C. for 6 hours, using a hot air drier. The dried pellets of the polycarbonate copolymer or the polycarbonate resin composition were supplied to an injection molding device (manufactured by The Japan Steel Works, Ltd., trade name: Type J75EII), and formed into ISO specimens for mechanical property, under conditions that the resin temperature was 240° C., the molding temperature was 60° C., and the molding cycle was 40 seconds. In compliance with ISO 75, the obtained ISO specimens for mechanical property were measured for a load deflection temperature with a load of 1.80 MPa applied.

(3) Weather Resistance Test (ΔE*)

Using a sunshine weather meter S80 manufactured by Suga Test Instruments Co., Ltd. in compliance with JIS B7753, with a sunshine carbon arc (four pairs of ultra-long life carbon) light source a discharge voltage and a discharge current of which are set to 50 V and 60 A, under conditions that the specimens were irradiated with the light and the surface of the specimens was sprayed (subjected to rainfall) at a black panel temperature of 63° C. and a relative humidity of 50%, a square face of an injection-molded flat plate (100 mm in width×100 mm in length×2 mm in thickness) was irradiated with light for 1000 hours. The surface was sprayed (subjected to rainfall) for 12 minutes/1 hour. An A-type glass filter was used. L*a*b* after irradiation was measured in compliance with JIS Z 8722, and ΔE* was obtained from a value before the test.

(4) Overall Determination

The specimens having a Charpy impact strength of 10 kJ/m$^2$ or more and a load deflection temperature of 94° C. or above were determined to be good. The other specimens were determined to be poor.

[Raw Materials]

<Raw Materials for Polycarbonate Resin Mixture>

D7340R Isosorbide polycarbonate (ISB/CHDM=70/30 (molar ratio) produced by Mitsubishi Chemical Corporation.

D5380R Isosorbide polycarbonate (ISB/CHDM=50/50 (molar ratio) produced by Mitsubishi Chemical Corporation.

<Rubber Component>

M-590 butyl acrylate-methyl methacrylate-styrene based rubber produced by Kaneka Corporation.

<Hindered Phenol Based Antioxidant Having Molecular Weight Ranging from 1100 to 1200 (Component (A))>

Irganox 1010 pentaerythritol-tetrakis [3-(3,5-di-tert-butyl-4-hydroxyphenyl) propionate] produced by BASF and having a molecular weight of 1176.

<Dibutylhydroxytoluene (Component (B))>

BHT dibutylhydroxytoluene produced by API Corporation.

1,1,3-tris-(2-Methyl-4-Hydroxy-5-t-Butylphenyl) Butane (Component (C))

AO-30 1,1,3-tris-(2-Methyl-4-Hydroxy-5-t-Butylphenyl) butane produced by ADEKA Corporation.

Tris (2,4-di-t-butylphenyl) Phosphite (Component (D))

AS 2112 tris (2,4-di-t-butylphenyl) phosphite produced by ADEKA Corporation.

Bis (2,4-di-t-butylphenyl) pentaerythritol-diphosphite (Component (E))

PEP-36 bis (2,4-di-t-butylphenyl) pentaerythritol-diphosphite produced by ADEKA Corporation.

<Benzotriazole Based Weathering Stabilizer Having a Melting Point Ranging from 102° C. to 106° C. (Component (F))>

LA-29 2-(2H-benzotriazole-2-yl)-4-(1,1,3,3-tetramethylbutyl) phenol produced by ADEKA Corporation and having a melting point of 104° C.

<Hindered Amine Based Weathering Stabilizer Having a Melting Point Ranging from 125° C. to 130° C. (Component (G))>

LA-57 HALS represented by Formula (3) below, produced by ADEKA Corporation and having a melting point of 130° C.

[Chem. 5]

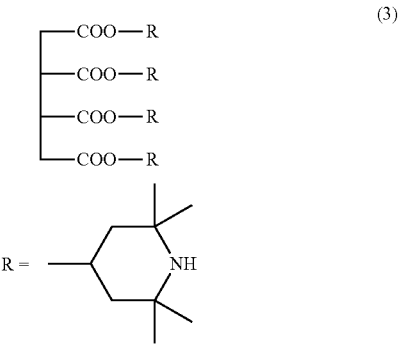

(3)

<Perinone Based Colorant Having a Melting Point Ranging from 252° C. to 258° C. (Component (H))>

Solvent Red 179 14H-benz [4,5]isoquino [2,1-a]perimidin-14-one produced by KIWA Chemical Industry Co., Ltd. and having a melting point of 255° C.

Example 1

Used were pellets of the polycarbonate copolymer and the rubber component (butyl acrylate-methyl methacrylate-styrene based rubber) shown in Table 1. Furthermore, the components (A) to (H) shown in Table 1 were blended with the polycarbonate copolymer and the rubber component. In addition, Solvent Green 3 and Solvent Blue 97 were mixed together so that the thermoplastic resin composition has a value L* of 1.0. The mixture was extruded in the shape of a strand, using a twin-screw extruder having two vent ports (manufactured by The Japan Steel Works, Ltd., trade name: LABOTEX30HSS-32) such that the resin at the extruder's port had a temperature of 250° C. The extruded resin was water-cooled and solidified, and then cut into pellets with a rotary cutter. At this time, the vent ports were coupled to a vacuum pump, and control was implemented such that a pressure at the vent ports was 500 Pa. Using the above methods, the obtained thermoplastic resin composition was measured and evaluated for an impact resistance (Charpy impact strength), a load deflection temperature, and a weather resistance test (ΔE*). Table 1 shows the results.

Comparative Example 1

Used were pellets of the polycarbonate copolymer and the rubber component (butyl acrylate-methyl methacrylate-styrene based rubber) shown in Table 1. Except that the thermoplastic resin compositions were blended in the amounts shown in Table 1, the tests were conducted in a similar manner as done in Example 1 to produce and evaluate the thermoplastic resin compositions. Table 1 shows the results.

Comparative Example 2

Used were pellets of the polycarbonate copolymer shown in Table 1. Except that the thermoplastic resin compositions were blended in the amounts shown in Table 1, the tests were conducted in a similar manner as done in Example 1 to produce and evaluate the thermoplastic resin compositions. Table 1 shows the results.

Comparative Example 3

Used were pellets of the polycarbonate copolymer shown in Table 1. Except that the thermoplastic resin compositions were blended in the amounts shown in Table 1, the tests were conducted in a similar manner as done in Example 1 to produce and evaluate the thermoplastic resin compositions. Table 1 shows the results.

TABLE 1

|  |  |  |  | Example | Comparative Example | | |
|---|---|---|---|---|---|---|---|
|  |  |  |  | 1 | 1 | 2 | 3 |
| Polycarbonate Resin Composition | Polycarbonate Resin | D7340R | (% by weight) | 85 | 85 | 90 | 25 |
|  |  | D5380R | (% by weight) | 10 | 10 | 10 | 75 |
|  |  | Composition Ratio after Two Types Mixed (ISB/CHDM) |  | 68/32 | 68/32 | 68/32 | 55/45 |
|  | Rubber Component | M-590 | (% by weight) | 5 | 5 | 0 | 0 |
|  | Component (A) | Irganox 1010 | (% by weight) | 0.1 | 0.1 | 0.1 | 0.1 |
|  | Component (B) | BHT | (% by weight) | 0.01 | 0.01 | 0.01 | 0.01 |
|  | Component (C) | AO-30 | (% by weight) | 0.05 | 0.05 | 0 | 0 |
|  | Component (D) | AS2112 | (% by weight) | 0.05 | 0.05 | 0.05 | 0.05 |
|  | Component (E) | PEP-36 | (% by weight) | 0.2 | 0.2 | 0 | 0 |
|  | Component (F) | LA-29 | (% by weight) | 0.3 | 0.3 | 0.1 | 0.1 |
|  | Component (G) | LA-57 | (% by weight) | 0.1 | 0.1 | 0.1 | 0.05 |
|  | Component (H) | Solvent Red 179 | (% by weight) | 0.06 | 0.12 | 0.09 | 0.09 |
| Evaluation Result | Charpy Impact Strength | | (kJ/m$^2$) | 16 | 15 | 7 | 10 |
|  | Load Deflection Temperature | | (° C.) | 99 | 99 | 100 | 85 |
|  | Weather Resistance Test | | ($\Delta$E*) | 0.3 | 1.3 | 1.9 | 1.5 |
|  | Overall Evaluation | | | Good | Poor | Poor | Poor |

(Results)

Table 1 clearly shows that, the amount of colorant (the component (H)) in Comparative Example 1 is not within the range of the amount of the colorant in the present disclosure. Thus, Comparative Example 1 fails to pass the weather resistance test. Moreover, in Comparative Example 2, an impact resistance agent (a rubber component) is not included, and the contents of the weather resistance additive (the component (G)) and the colorant (the component (H)) in Comparative Example 2 are different from those in the present disclosure. Thus, Comparative Example 2 fails to pass the impact resistance and weather resistance tests. Furthermore, Comparative Example 3 is different in composition of isosorbide polycarbonate from Comparative Example 2. Comparative Example 3 is good in impact resistance to some degree; whereas, Comparative Example 3 is extremely poor in heat resistance. Meanwhile, in Example 1 which satisfies the definition of the present disclosure, the automotive interior and exterior member has high heat, impact, and weather resistance.

What is claimed is:
1. An automotive interior and exterior member comprising a polycarbonate resin composition,
    wherein the polycarbonate resin composition contains polycarbonate resin which is a composite including a plurality of carbonate copolymers each (i) including a structural unit (an ISB unit) derived from a dihydroxy compound represented by a general formula (1) below and a structural unit (a CHDM unit) derived from cyclohexanedimethanol and (ii) having a different copolymerization ratio,
    the ISB unit and the CHDM unit in the polycarbonate resin are contained in a molar ratio ranging from 67/33 to 69/31 (molar ratio),
    in the polycarbonate resin composition, (i) 4.9 parts by weight to 5.1 parts by weight of butyl acrylate-methyl methacrylate-styrene based rubber and (ii) components (A) to (H) in contents below are contained with respect to a total 100 parts by weight of the polycarbonate resin and the butyl acrylate-methyl methacrylate-styrene based rubber:
    a component (A) containing 0.09 parts by weight to 0.11 parts by weight of a hindered phenol based antioxidant having a molecular weight ranging from 1100 to 1200;
    a component (B) containing 0.001 parts by weight to 0.015 parts by weight of dibutylhydroxytoluene;
    a component (C) containing 0.049 parts by weight to 0.051 parts by weight of 1,1,3-tris-(2-methyl-4-hydroxy-5-t-butylphenyl) butane;
    a component (D) containing 0.049 parts by weight to 0.051 parts by weight of tris (2,4-di-t-butylphenyl) phosphite;
    a component (E) containing 0.19 parts by weight to 0.21 parts by weight of bis (2,4-di-t-butylphenyl) pentaerythritol-diphosphite;
    a component (F) containing 0.29 parts by weight to 0.31 parts by weight of a benzotriazole based weathering stabilizer having a melting point ranging from 102° C. to 106° C.;
    a component (G) containing 0.09 parts by weight to 0.11 parts by weight of a hindered amine based weathering stabilizer having a melting point ranging from 125° C. to 130° C.; and
    a component (H) containing 0.05 parts by weight to 0.07 parts by weight of perinone based colorant having a melting point ranging from 252° C. to 258° C.

[Chem.1]

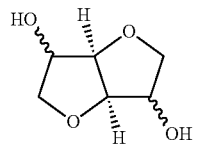

(1)

2. The automotive interior and exterior member of claim 1 wherein the component (G) is the hindered amine based weathering stabilizer including a plurality of piperidine structures.

3. The automotive interior and exterior member of claim 2 wherein the plurality of piperidine structures of the hindered amine based weathering stabilizer of the component (G) are linked to a single alkane chain via an ester linkage.

* * * * *